US012597206B2

(12) United States Patent
Brown et al.

(10) Patent No.: US 12,597,206 B2
(45) Date of Patent: Apr. 7, 2026

(54) MECHANICAL WEIGHT INDEX MAPS FOR MESH RIGGING

(71) Applicant: Hinge Health, Inc., San Francisco, CA (US)

(72) Inventors: Colin Joseph Brown, Saskatoon (CA); Sohail Zangenehpour, Beaconsfield (CA); Paul Anthony Kruszewski, Westmount (CA)

(73) Assignee: Hinge Health, Inc., San Francisco, CA (US)

( * ) Notice: Subject to any disclaimer, the term of this patent is extended or adjusted under 35 U.S.C. 154(b) by 112 days.

(21) Appl. No.: 18/392,982

(22) Filed: Dec. 21, 2023

(65) Prior Publication Data

US 2024/0127539 A1    Apr. 18, 2024

Related U.S. Application Data

(63) Continuation of application No. PCT/IB2021/055506, filed on Jun. 22, 2021.

(51) Int. Cl.
*G06T 17/20*        (2006.01)
*G06T 7/11*         (2017.01)

(52) U.S. Cl.
CPC ................. *G06T 17/20* (2013.01); *G06T 7/11* (2017.01); *G06T 2207/20084* (2013.01)

(58) Field of Classification Search
CPC . G06T 13/40; G06T 7/75; G06T 2207/20084; G06T 7/11; G06T 17/20; G06T 17/00; G06N 3/0464; G06N 3/045; G06N 3/09

USPC .......................................................... 345/418
See application file for complete search history.

(56)                References Cited

U.S. PATENT DOCUMENTS

| | | | | |
|---|---|---|---|---|
| 10,776,981 | B1 | 9/2020 | Gorbatyuk et al. | |
| 11,010,896 | B2 | 5/2021 | Kamiyama et al. | |
| 2020/0193591 | A1* | 6/2020 | Kamiyama | G06T 7/60 |
| 2020/0319015 | A1* | 10/2020 | Kamiyama | A61B 5/1079 |
| 2020/0410735 | A1* | 12/2020 | Gorbatyuk | G06F 3/0482 |

(Continued)

OTHER PUBLICATIONS

Amherd F, Rodriguez E. Heatmap-based object detection and tracking with a fully convolutional neural network. arXiv preprint arXiv:2101.03541. Jan. 10, 2021.*

(Continued)

*Primary Examiner* — Phu K Nguyen
(74) *Attorney, Agent, or Firm* — Perkins Coie LLP; Andrew T. Pettit

(57)                ABSTRACT

An apparatus is provided to generate mechanical index maps for mesh rigging. The apparatus includes a communications interface to receive raw data from an external source. The raw data includes a representation of an object. The apparatus further includes a memory storage unit to store the raw data. In addition, the apparatus includes a pre-processing engine to generate a segmentation map from the raw data. The segmentation map is to outline the object. Furthermore, the apparatus includes a neural network engine to generate a mechanical heatmap for a predefined key-point connector based on the segmentation map. The mechanical heatmap includes a mechanical weight index of the predefined key-point connector for each pixel.

23 Claims, 14 Drawing Sheets

(56) References Cited

U.S. PATENT DOCUMENTS

2021/0264207 A1*  8/2021  Smith ................... G06V 10/44

OTHER PUBLICATIONS

Hou C, Xue Z, Zhou B, Ke J, Shao L, Xu H. Key-grid: Unsupervised 3d keypoints detection using grid heatmap features. Advances in Neural Information Processing Systems. Dec. 16, 2024;37:49154-79.*

Ge, et al., "Robust 3D Hand Pose Estimation From Single Depth Images Using Multi-View CNNs", IEEE Transactions on Image Processing, vol. 27 Issue No. 9, Sep. 2018, 1-15.

Tompson, et al., "Real-Time Continuous Pose Recovery of Human Hands Using Convolutional Networks", ACM Transactions on Graphics, vol. 33 Issue No., 5 Article 169., Sep. 23, 2014, 1-10.

Ze, Yang, "S3: Neural Shape, Skeleton, and Skinning Fields for 3D Human Modeling", arXiv Computer Science: Computer Vision and Pattern Recognition; Retrieved from the Internet: URL:https://arxiv.org/pdf/2101.06571>, Jan. 17, 2021, 1-16.

Neverova, Natalia , "Deep learning for human motion analysis", Computer vision and Pattern Recognition [cs.CV]. Insa Lyon, 2016. English. NNT : 2016LYSEI0; Diss. Universite de Lyon, 206, p. 74, section 3.6, pp. 76, 86, 167.

International Search Report and Written Opinion mailed on Aug. 17, 2021 for International Patent Application No. PCT/IB2021/055506; 11 pages.

* cited by examiner

100

105

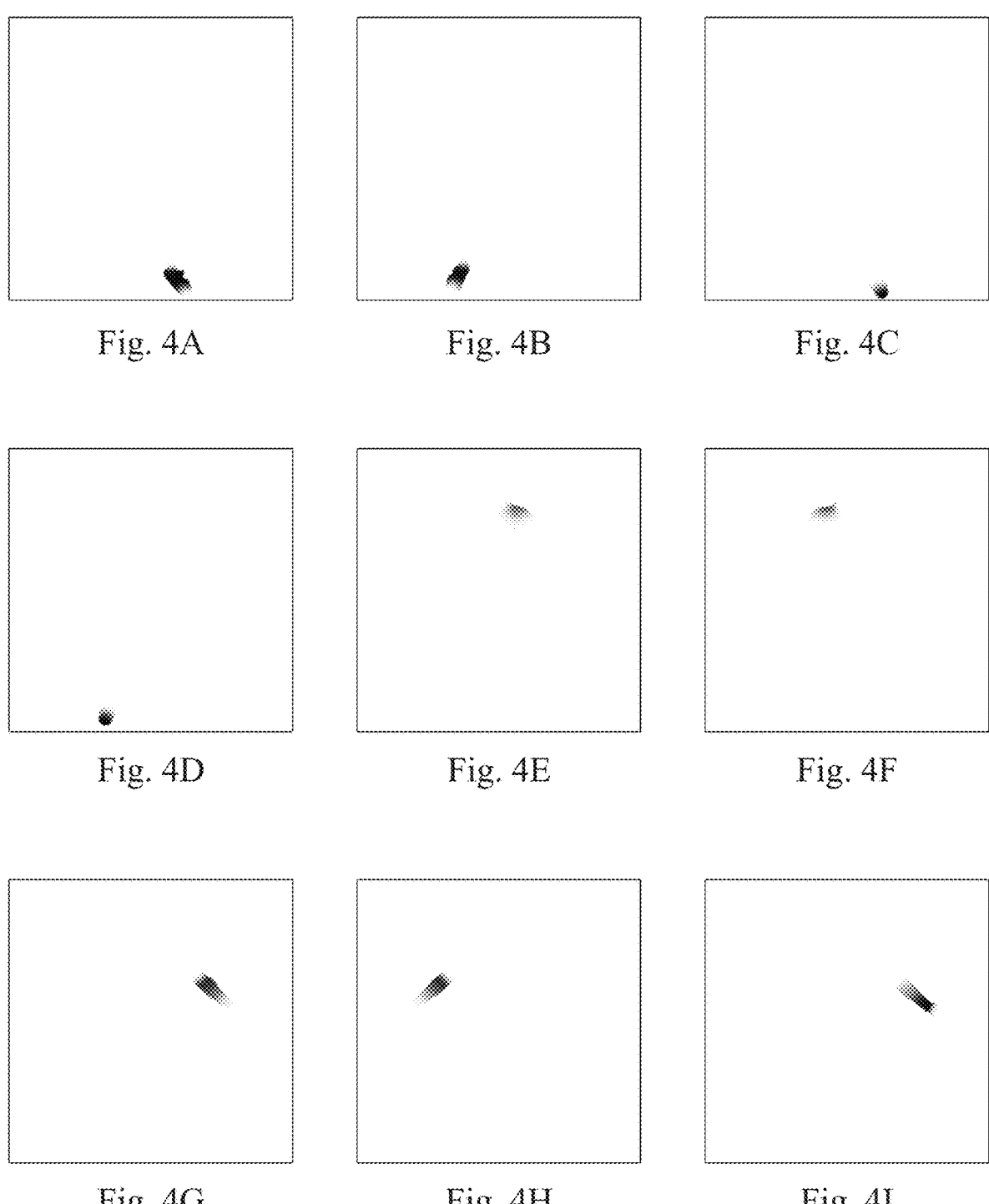
Fig. 4A                    Fig. 4B                    Fig. 4C
Fig. 4D                    Fig. 4E                    Fig. 4F
Fig. 4G                    Fig. 4H                    Fig. 4I

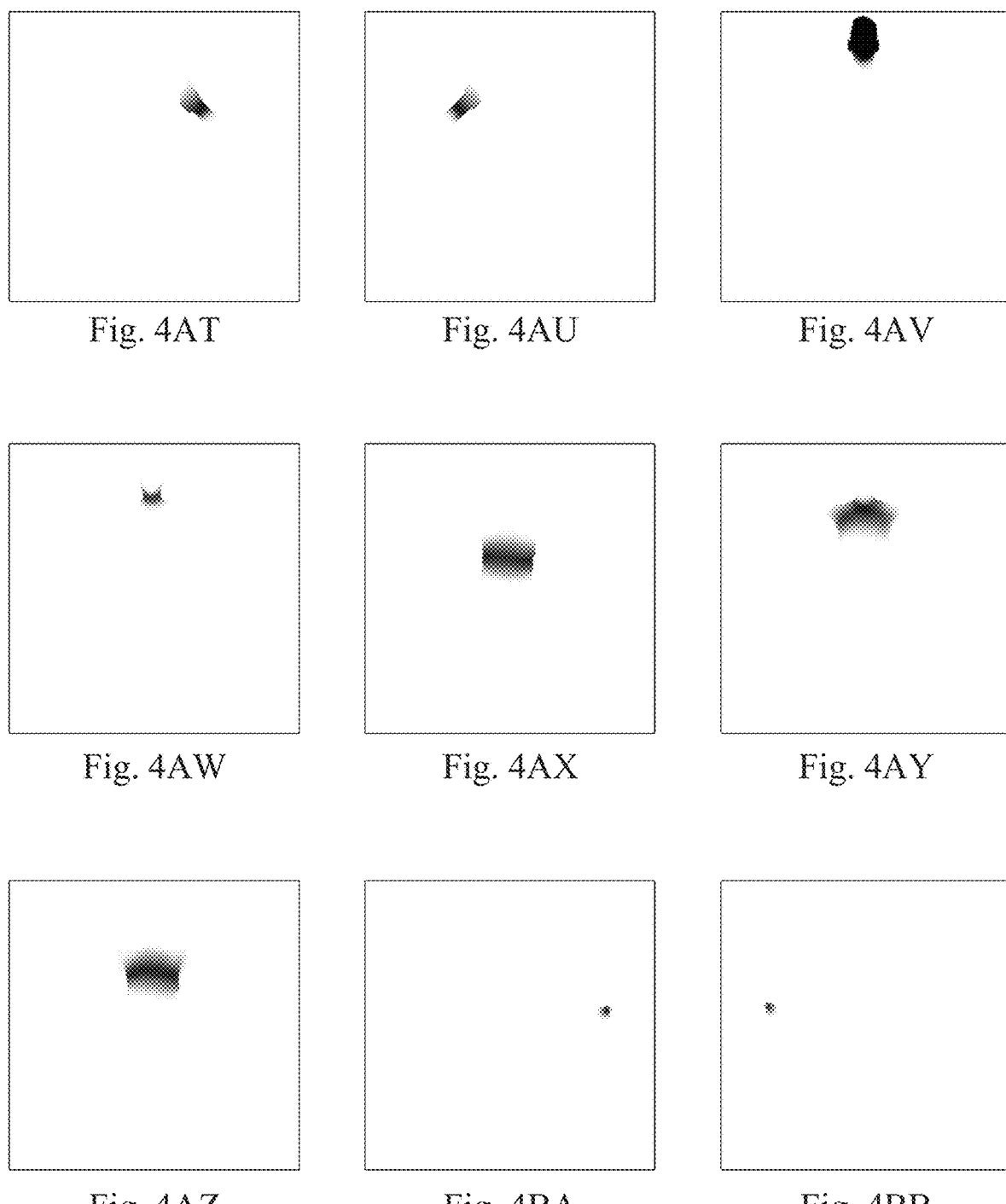
Fig. 4AT                    Fig. 4AU                    Fig. 4AV
Fig. 4AW                    Fig. 4AX                    Fig. 4AY
Fig. 4AZ                    Fig. 4BA                    Fig. 4BB

150

200

MECHANICAL WEIGHT INDEX MAPS FOR MESH RIGGING

CROSS-REFERENCE TO RELATED APPLICATION

This application is a continuation of International Patent Application No. PCT/IB2021/055506, titled "MECHANICAL WEIGHT INDEX MAPS FOR MESH RIGGING" and filed on Jun. 22, 2021, which is incorporated herein by reference in its entirety.

BACKGROUND

Computer animation may be used in various applications such as computer generated imagery in the film, video games, entertainment, biomechanics, training videos, sports simulators, and other arts. Animations of people or other objects may involve the generation of a three-dimensional mesh which may be manipulated by the computer animation system to carry out various motions in three-dimension. The motions may be viewed by a user or audience from a single angle, or from multiple angles.

The objects to be animated in a computer animation are typically pre-programmed into the system. For example, an artist or illustrator may develop a general appearance of the object, such as a person, to be animated. During animations, as parts of the person change pose, the mesh or skin position may be affected by the movement of the associated proximate joints. The amount by which the mesh or skin moves may vary and the dependence on the movement or rotation about a joint may vary.

BRIEF DESCRIPTION OF THE DRAWINGS

Reference will now be made, by way of example only, to the accompanying drawings in which.

DETAILED DESCRIPTION

Figure 1:
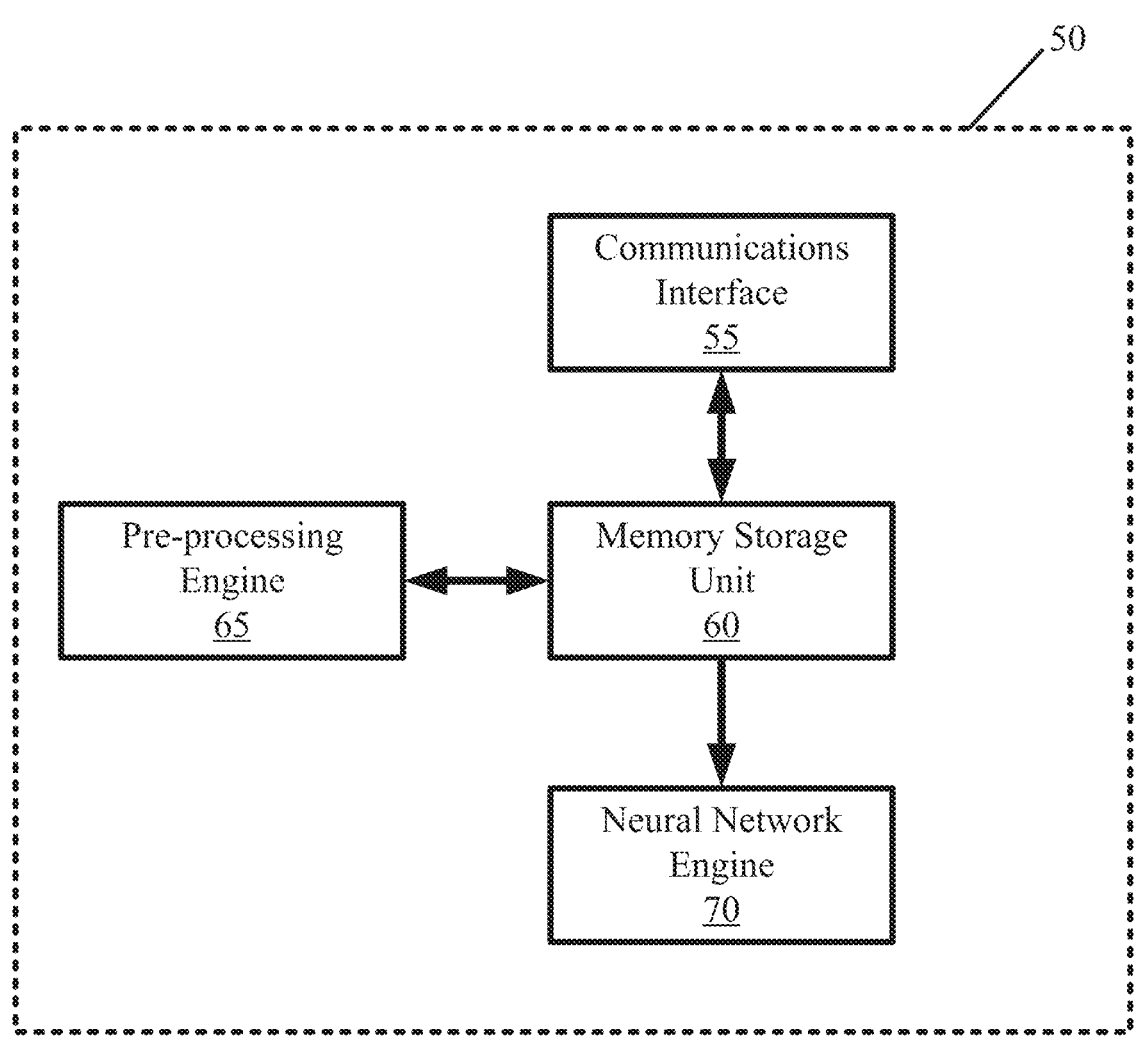
FIG. 1 is a schematic representation of the components of an example apparatus to generate and assign a mechanical weight index for mesh skinning.

As used herein, any usage of terms that suggest an absolute orientation (e.g. "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Computer animation is used in a broad range of different sectors to provide motion to various objects, such as people. In many examples of computer animation, a three-dimensional representation of an object is created with various characteristics. The characteristics are not particularly limited and may be dependent on the object as well as the expected motions and range of motions that the object may have. For example, if the object is a car, the car may be expected to have a standard shape such as a sedan with doors that open and wheels that may spin and front wheels that may be turned within a predetermined range of angles.

In other examples where the object is a person, the person will have various key-point connectors or bones with different degrees of motions. It is to be appreciated by a person of skill in the art with the benefit of this description that the term "bone" refers to various key-point connectors in a person that may be modeled with various degrees and ranges of motion to represent an approximation of the bone on a person. For example, a bone may refer to an estimated rigid connection on a person that is not a physiological bone. In other examples, a bone may refer to a connector between multiple key-points or joints.

Accordingly, objects to be animated may generally be represented by a pre-programmed mesh with the relevant characteristics, such as the position and the motion at each key-point connector. The movement of each key-point connector or movement about each key-point connector if it is a rotational movement may have a corresponding movement in a three-dimensional mesh of the object. For example, a three-dimensional mesh of a person may be generated from key-point connectors representing approximated body parts of a person, such as an upper arm or lower arm, to mimic the natural movements of the person. Color may be added to the mesh to match skin color and/or clothes and texture may also be added to provide the appearance of a real person. However, the movements of the vertices of the mesh may not appear natural if directly linked to the movement at or about each key-point connector as the movement of each vertex may be dependent on multiple key-points or joints or to varying degrees compared to the neighboring vertices.

An apparatus and method of determining a mechanical weight index, also known as a mesh skin weight, for each vertex of a mesh in two-dimensions to describe the relationship between the vertex and a key-point connector is provided. The apparatus may receive an image representing an object and then rig a mechanical weight index heatmap. By providing a means to generate a mesh with vertices that move based on movements of a key-point connector in accordance with a mechanical weight index, life-like avatars and characters may be animated with motions that appear natural.

In the present description, the models and techniques discussed below are generally applied to a person. It is to be appreciated by a person of skill with the benefit of this description that the examples described below may be applied to other objects as well such as animals and machines.

Referring to FIG. 1, a schematic representation of an apparatus to generate and assign a mechanical weight index based on a single two-dimensional image for mesh skinning is generally shown at 50. The apparatus 50 may include additional components, such as various additional interfaces and/or input/output devices such as indicators to interact with a user of the apparatus 50. The interactions may include viewing the operational status of the apparatus 50 or the

Figure 2:
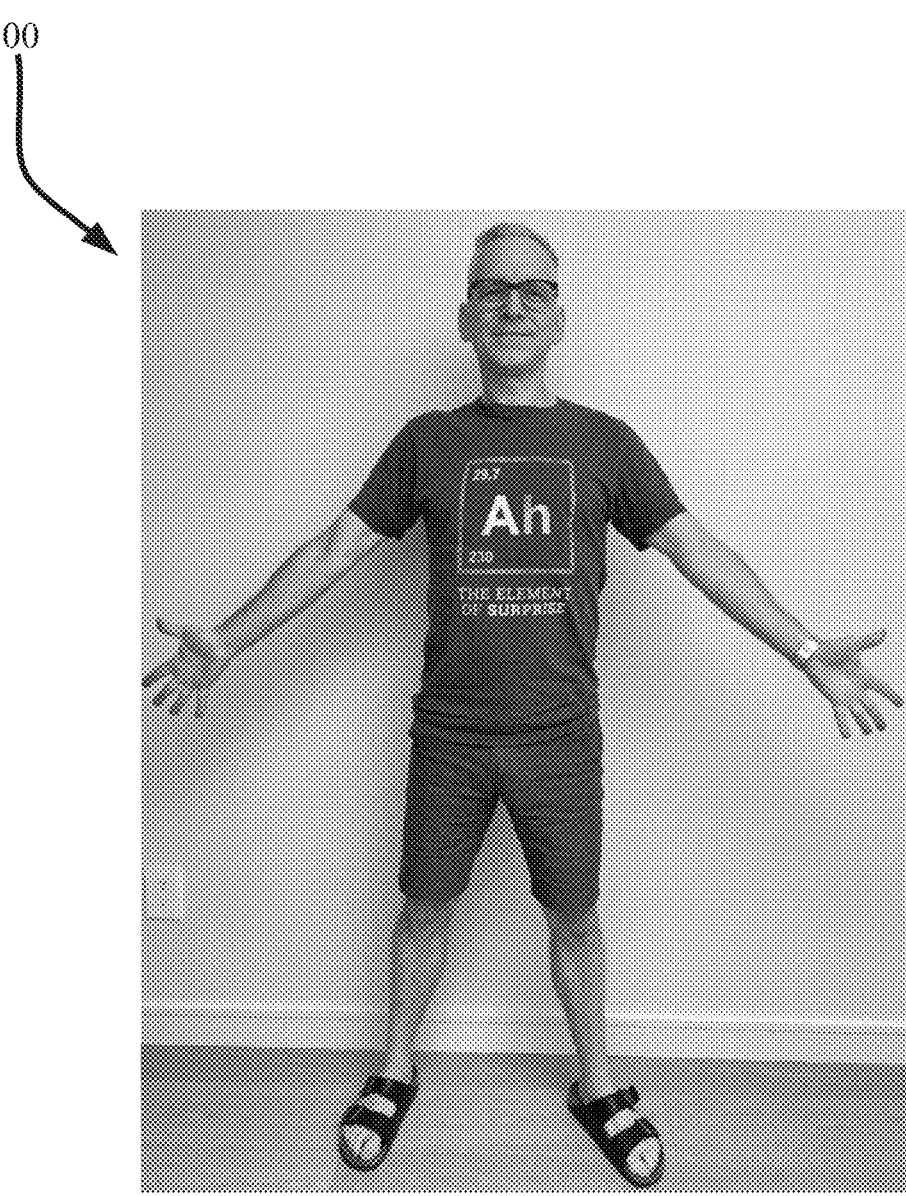
FIG. 2 is an example of raw data representing an image received at the apparatus of FIG. 1.

3 system in which the apparatus 50 operates, updating param-
eters of the apparatus 50, or resetting the apparatus 50. In the
present example, the apparatus 50 is to receive raw data,
such as raw data represent an image 100 as shown in FIG.
2, and to process the raw data to generate a mechanical
weight index for a key-point connector. In the present
example, the apparatus 50 includes a communications inter-
face 55, a memory storage unit 60, a pre-processing engine
65, and a neural network engine 70.

The communications interface 55 is to communicate with
an external source to receive raw data representing an object.
In the present example, the communications interface 55
may communicate with external source over a network,
which may be a public network shared with a large number
of connected devices, such as a WiFi network or cellular
network. In other examples, the communications interface
55 may receive data from an external source via a private
network, such as an intranet or a wired connection with other
devices. As another example, the communications interface
55 may connect to another proximate device via a wired
connection, a Bluetooth connection, radio signals, or infra-
red signals. In particular, the communications interface 55 is
to receive raw data from the external source to be stored on
the memory storage unit 60.

The memory storage unit 60 is to store data received via
the communications interface 55. In particular, the memory
storage unit 60 may store raw data including two-dimen-
sional images representing objects from which a mechanical
heatmaps of a weight index is to be generated. In the present
example, the memory storage unit 60 may store multiple
two-dimensional images representing an object in two-
dimensions. In particular, the objects may be an image of a
person in an A-pose clearly showing multiple and substan-
tially symmetrical key-point connectors. In other examples,
the object may be a person in a T-pose position. In further
examples, the person in the raw data may be in a natural pose
with one or more key-points and key-point connectors
obstructed from view. Although the present examples each
relate to a two-dimensional image of a person, it is to be
appreciated with the benefit of this description that the
examples may also include images that represent different
types of objects, such as an animal or machine.

The memory storage unit 60 may be also used to store
addition data to be used by the apparatus 50. For example,
the memory storage unit 60 may store various reference data
sources, such as templates and model data. It is to be
appreciated that the memory storage unit 60 may be a
physical computer readable medium used to maintain mul-
tiple databases, or may include multiple mediums that may
be distributed across one or more external servers, such as
in a central server or a cloud server.

In the present example, the memory storage unit 60 is not
particularly limited includes a non-transitory machine-read-
able storage medium that may be any electronic, magnetic,
optical, or other physical storage device. The memory stor-
age unit 60 may be used to store information such as data
received from external sources via the communications
interface 55, template data, training data, pre-processed data
from the pre-processing engine 65, or results from the neural
network engine 70. In addition, the memory storage unit 60
may be used to store instructions for general operation of the
apparatus 50. For example, the memory storage unit 60 may
store an operating system that is executable by a processor
to provide general functionality to the apparatus 50 such as
functionality to support various applications. The memory
storage unit 60 may additionally store instructions to operate
the pre-processing engine 65 and the neural network engine

4

70. The memory storage unit 60 may also store control
instructions to operate other components and any peripheral
devices that may be installed with the apparatus 50, such as
cameras and user interfaces.

In some examples, the memory storage unit 60 may be
preloaded with data, such as training data or instructions to
operate components of the apparatus 50. In other examples,
the instructions may be loaded via the communications
interface 55 or by directly transferring the instructions from
a portable memory storage device connected to the appara-
tus 50, such as a memory flash drive.

Figure 3:
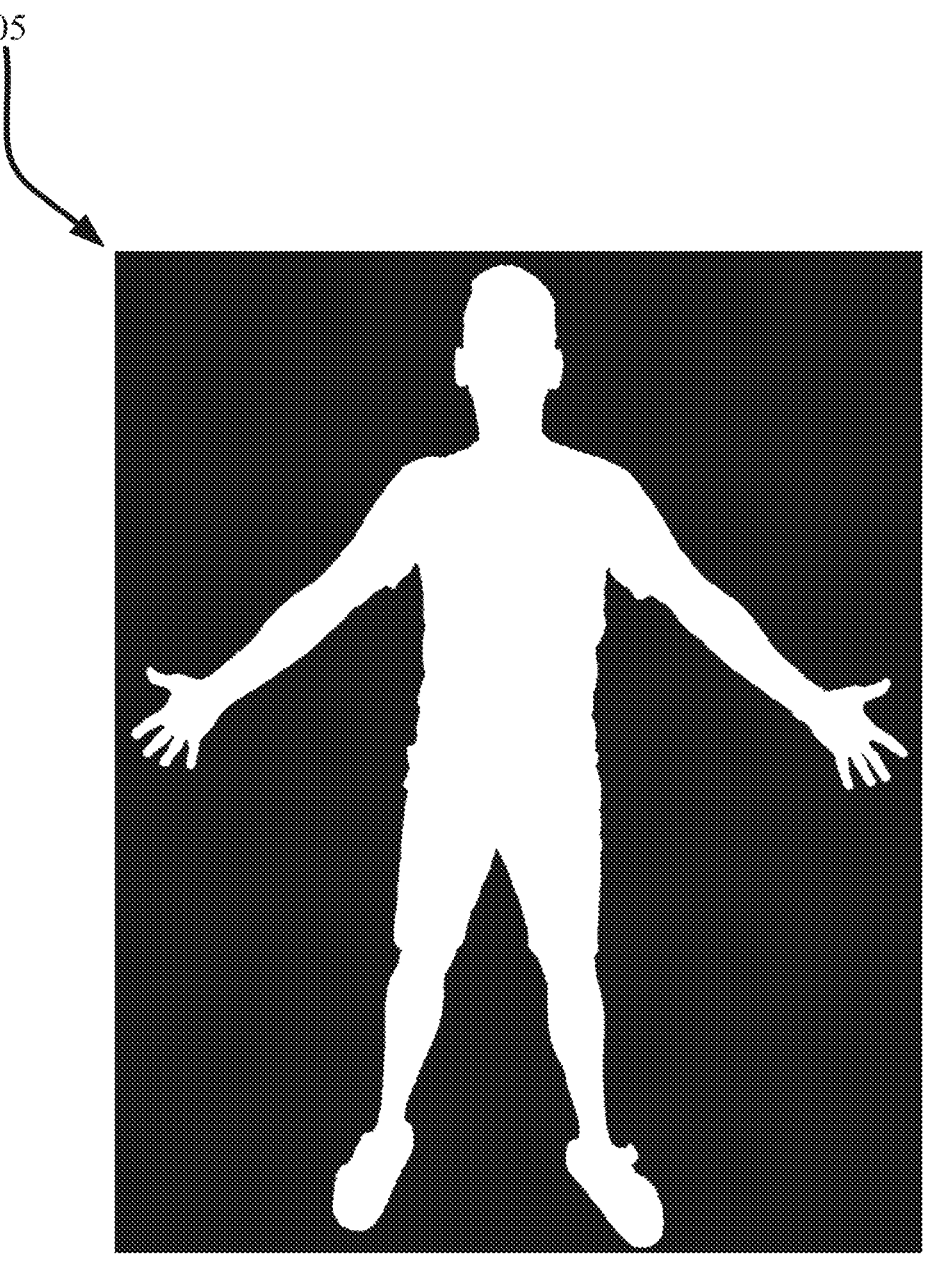
FIG. 3 is a segmentation map of the image of FIG. 2.

The pre-processing engine 65 is to pre-process the raw
data from the memory storage unit 60 to generate a seg-
mentation map 105 as shown in FIG. 3. In the present
example, the raw data may include an image of an object. It
is to be appreciated by a person of skill in the art that the
format of the raw data is not particularly limited. To illus-
trate the operation of the pre-processing engine 65, the raw
data may be rendered to provide the image 100 shown in
FIG. 2. In this specific example, the object of the raw data
represents a photograph of a person in the A-pose. The
format of the raw data is not particularly limited. For
example, the raw data in this specific example is an RGB
image which may be represented as three superimposed
maps for the intensity of red color, green color, and blue
color. In other examples, the raw data may be in a different
format, such as a raster graphic file or another compressed
image file.

The segmentation map 105 generated by the pre-process-
ing engine 65 is to generally provide a mask of the object in
the present example. The segmentation map 105 is a two-
dimensional map that uses a binary value for each pixel to
indicate whether the pixel is part of the object. In the present
example, the segmentation map 105 of the image 100 shows
a similar shape as the person in the A-pose. It is to be
appreciated by a person of skill with the benefit of this
description that the segmentation map 105 may be used to
identify the pixels to be processed by the neural network
engine 70.

The generation of the segmentation map 105 is not
particularly limited and may involve various image process-
ing engines or user input. In the present example, a computer
vision-based human pose and segmentation system such as
the wrnchAI engine is used. In other examples, other types
of computer vision-based human segmentation systems may
be used such as OpenPose, Mask-R CNN, or other depth
sensor, stereo camera or LIDAR-based human segmentation
systems such as Microsoft Kinect or Intel RealSense. In
addition, the segmentation map may be annotated by hand
with an appropriate software such as CVAT or in a semi-
automated way with segmentation assistance tools such as
those in Adobe Photoshop or GIMP.

In some examples, the pre-processing engine 65 may
further identify a position in the segmentation map 105 for
each key-point of a plurality of key-points by generating a
two-dimensional key-point heatmap for each key-point. In
the present example, a key-point may be a joint which may
correspond to a position where the object carries out relative
motions between portions of the object. The key-points are
generally predetermined and defined with a set of attributes
based on the type of key-point, such as whether the key-
point represents an elbow or a shoulder. Continuing with the
present example of a person as the object, a key-point may
represent a joint on the person, such as a shoulder where an
arm moves relative to the torso. By identifying a hotspot in
the key-point heatmap, the pre-processing engine 65 may
determine the key-point position. Furthermore, the pre-processing engine 65 may identify multiple key-points that have been pre-defined. The number of key-points for an object is not particularly limited. For example, the pre-processing engine 65 may assign sixteen different key-points or joints to the image. In further examples, the pre-processing engine 65 may assign more key-points to capture higher resolution movements or fewer key-points to reduce the amount of computational resources used.

Although the present example shows the pre-processing engine 65 as part of the apparatus 50, it is to be appreciated that in some examples, the pre-processing engine 65 may be part of an external system providing pre-processed data or the pre-processed data may be generated by other methods, such as manually by a user.

The neural network engine 70 is to generate a mechanical heatmap for a predefined key-point connector based on the segmentation map 105 from the pre-processing engine 65. In the present example, the mechanical heatmap includes a mechanical weight index of the predefined key-point connector for each pixel of a two-dimensional image that represent a vertex of a three-dimensional mesh of the object.

The manner by which the mechanical heatmap is generated is not particularly limited. In the present example, the neural network engine 70 is to apply a convolutional neural network trained to estimate mechanical heatmaps representing an estimated mechanical weight of each key-point connector or bone on each pixel. The network architecture used by the neural network engine 70 may be any deep neural network architecture with sufficient depth, receptive field and model complexity to be capable of learning to perform this task including fully convolutional architectures such as U-net, Stacked Hourglass or HRNet.

Figures 4J, 4K, 4L, 4M, 4N, 4O, 4P, 4Q, 4R:
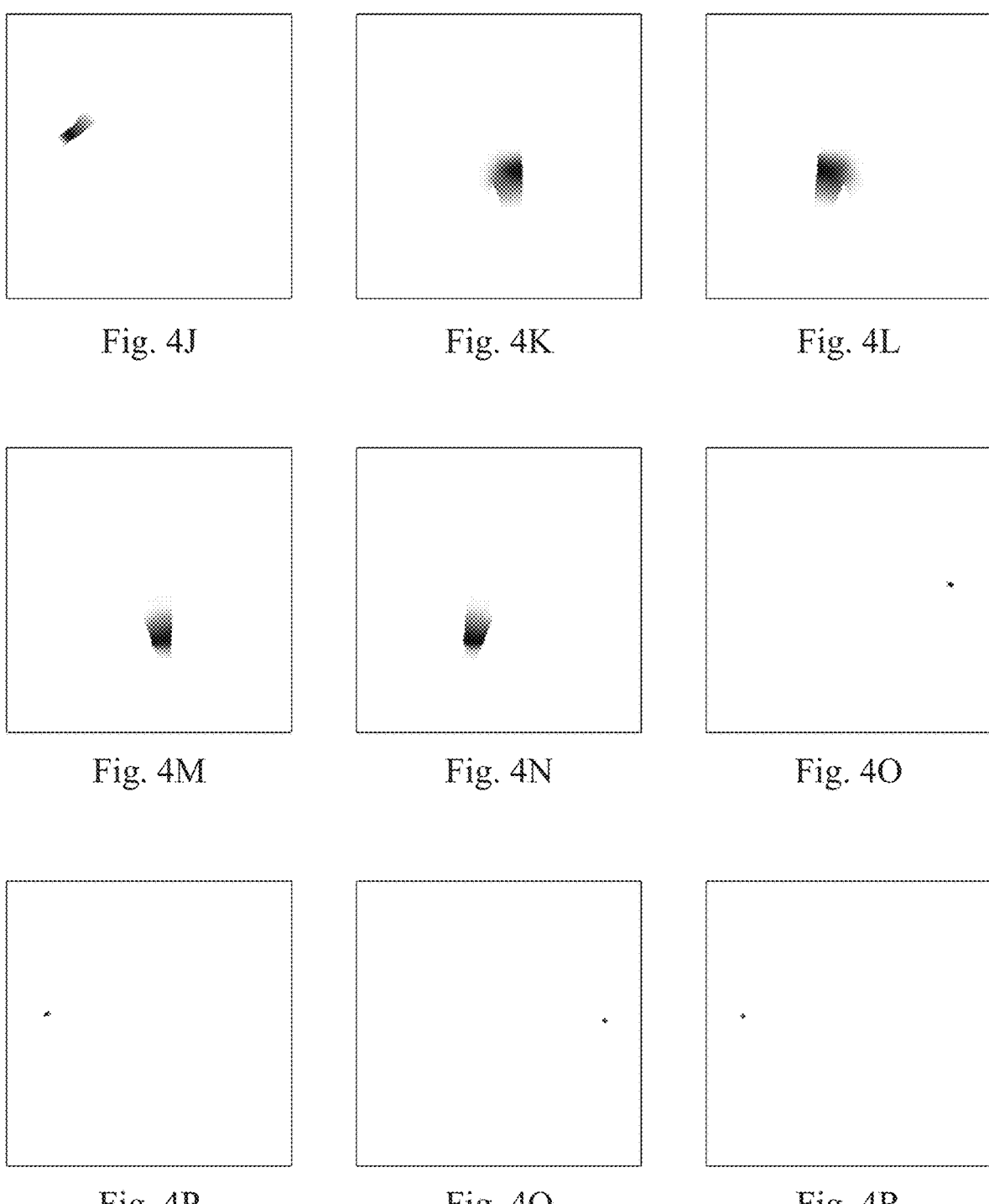
FIG. 4A-4BH are a mechanical index heatmaps of pre-defined key-point connectors generated from the image of FIG. 2.
Figures 4A, 4S, 4T, 4U, 4V, 4W, 4X, 4Y, 4Z:
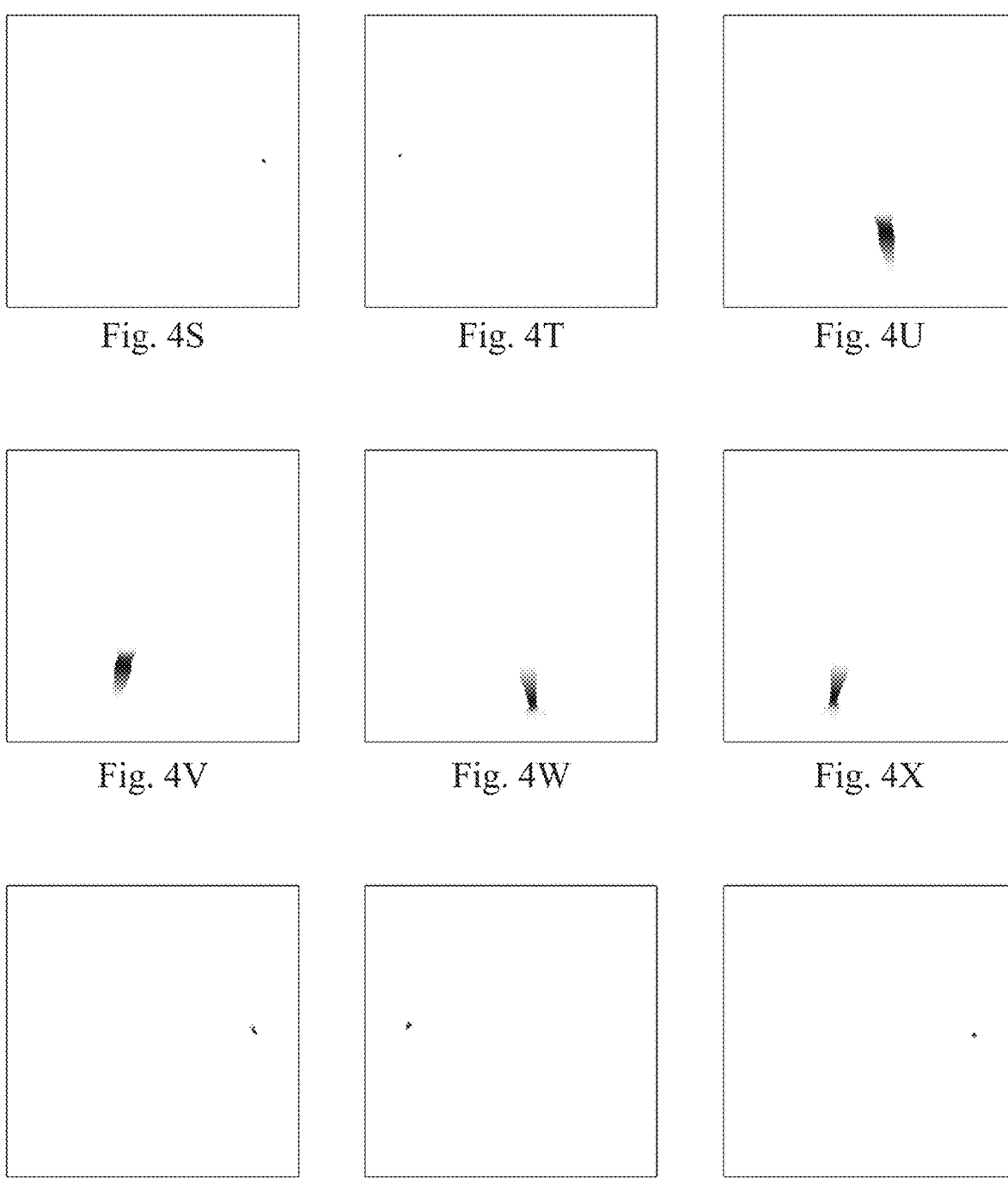
Figure 4A:
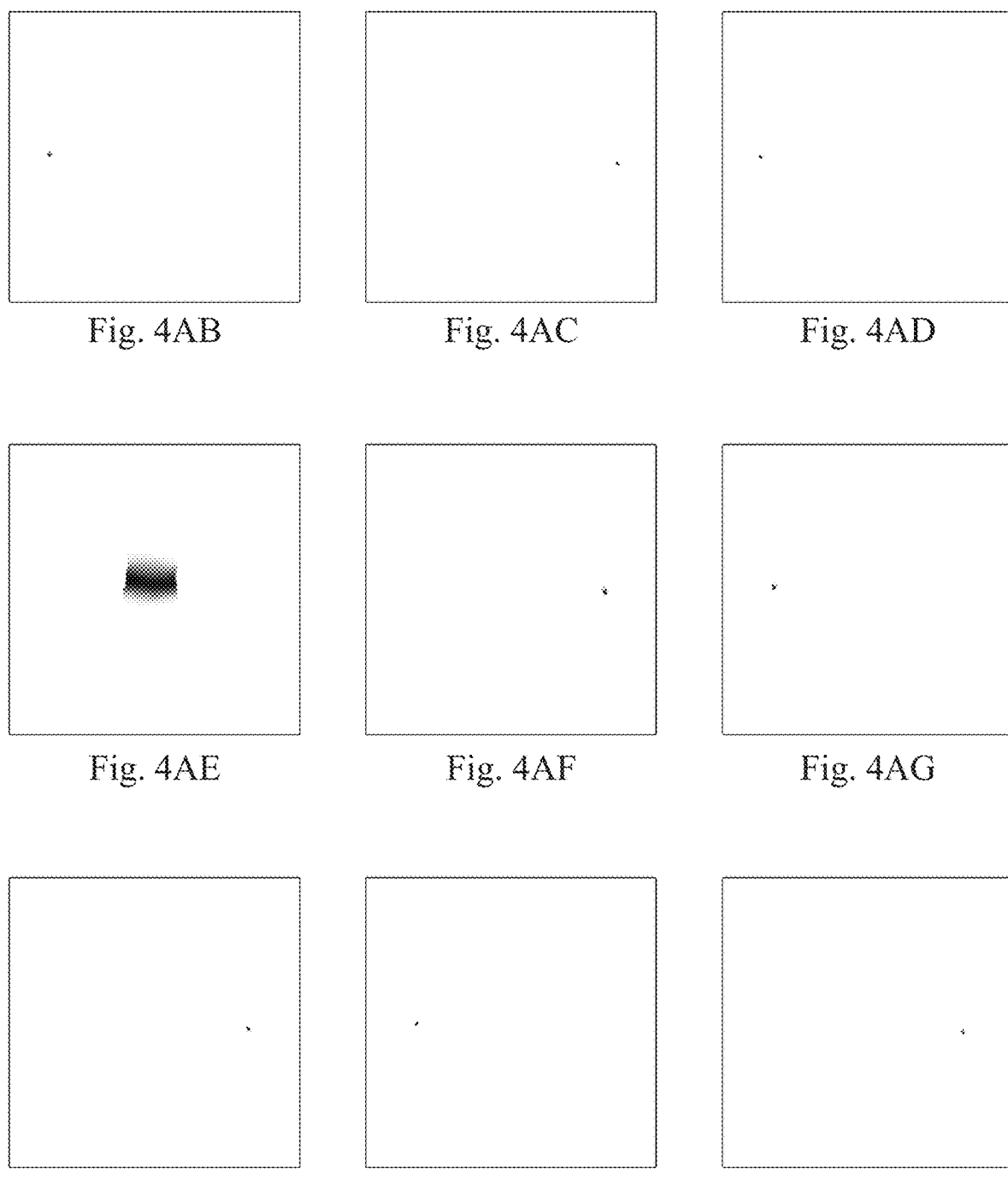
Figure 4A:
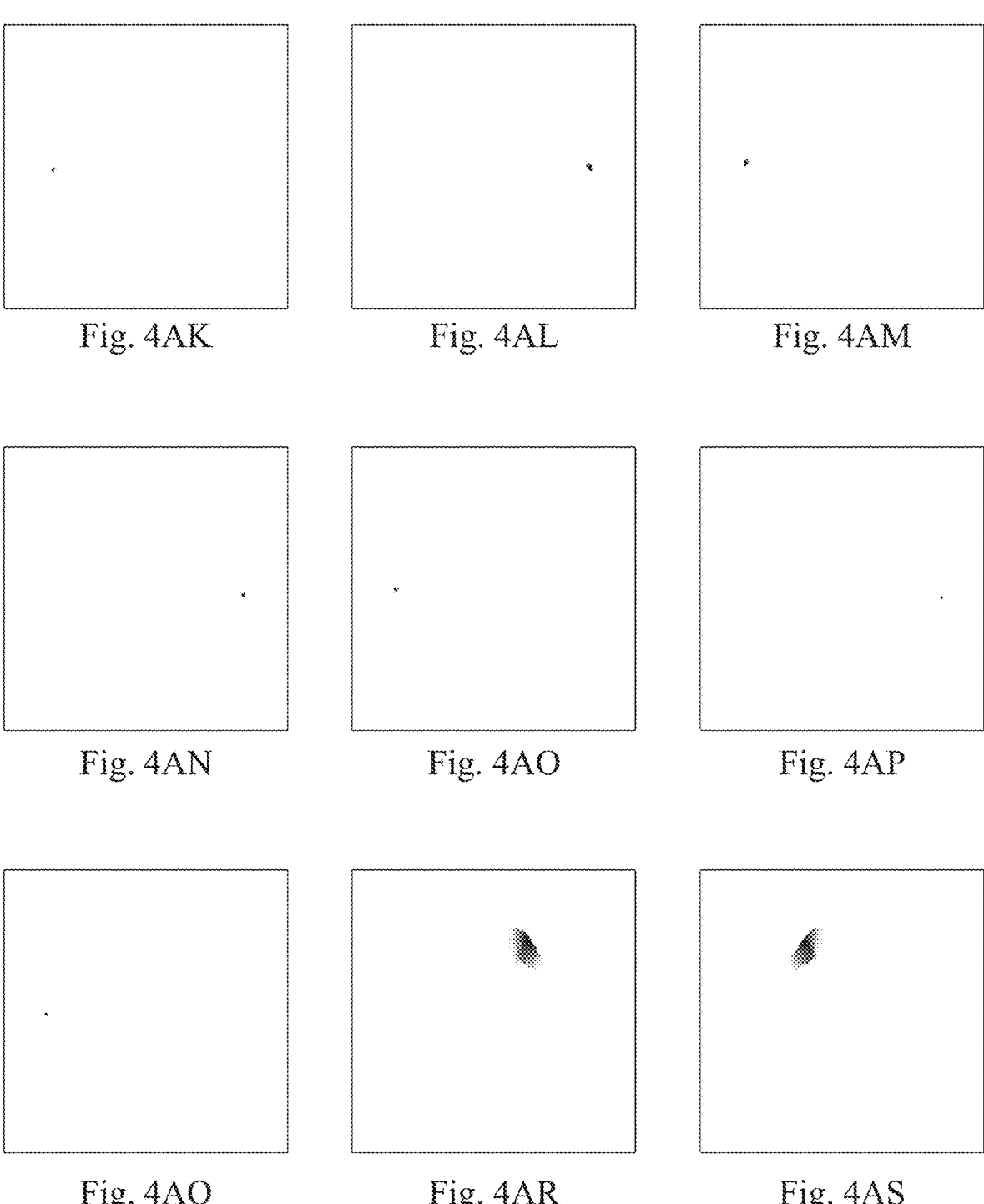
Figure 4B:
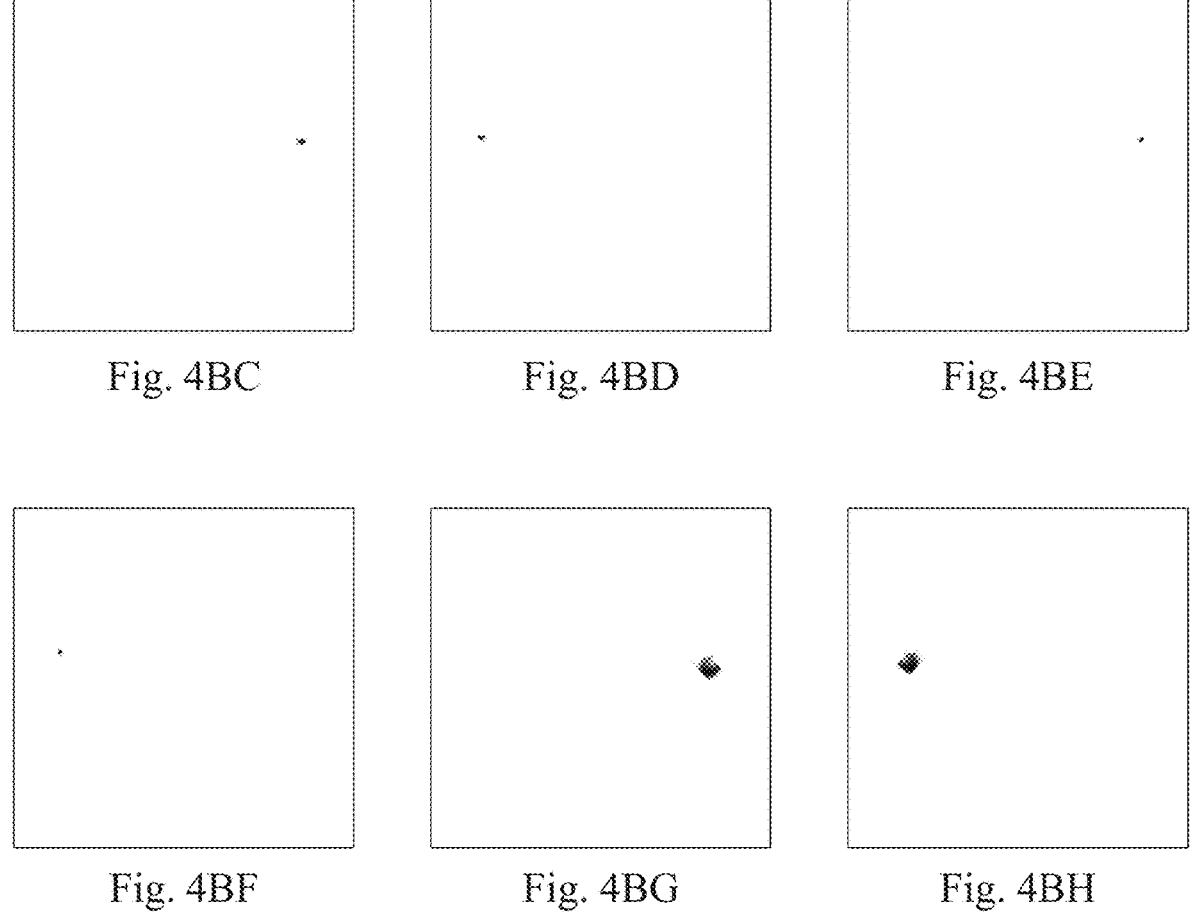

It is to be appreciated by a person of skill with the benefit of this description that the neural network engine 70 is to generate a mechanical heatmap for each key-point connector that is predefined in a model for the object. In the present example, the model includes 60 predefined key-point connectors to represent a person in the A-pose as shown in FIGS. 4A-4BH. It is to be appreciated that in other examples, more predefined key-point connectors may be used to increase the accuracy. Conversely, other examples may also use fewer heatmaps to decrease the amount of computational resources used to generate the plurality of heatmaps.

It is to be appreciated by a person of skill that the number of key-point connectors is not limited. In some examples, fewer key-point connectors or bones may be used to describe the object. Alternatively, additional key-point connectors or bones may be added to provide a higher resolution of motion. For each mechanical heatmap, a value is assigned for each pixel. In the present example, the values are normalized between zero and one to represent the weight index for each pixel of the key-point connector. As shown in FIG. 4, the weight index is generally concentrated around the position of each key-point connector. This is expected as the movement of a key-point connector is likely to affect the mesh closest to it.

In the present example, the neural network engine 70 is to be trained using synthetic data. The source of the synthetic data is not particularly limited. In the present example, the synthetic data may be a set of realistic humanoid skinned three-dimensional character models. The size of the training data set is not particularly limited and may be about 750 in some examples. In other examples, larger or smaller sets of training data may be used. The manner by which the character models of the training data are generated is not particularly limited. For example, the character models may be scanned using a camera or camera system. In other examples, the character models may be hand modeled. The vertex skin weights of these characters may be hand-painted in software such as Maya or auto-generated and then reviewed and corrected by hand. The character models may be rendered with a synthetic data generator to produce images of these characters in different poses, lighting conditions and with different backgrounds. The variation of poses may fit within the pre-defined criteria for acceptable poses to the inference system. The criteria are not limited and may include conditions such as whether the model is facing the camera, standing, palms orientation, etc. For each rendered image of a character model, the synthetic data generator may generate corresponding actual mechanical heatmaps by sampling all pixels inside the character model's segmentation map. The skin weights of each pixel are then calculated based on the linear interpolation between three vertices creating the polygon that the pixel belongs to. The process may be repeat by the synthetic data generator to generate a training dataset of rendered images and associated actual mechanical heatmaps for each rendered image.

The number of generated training images in the training dataset is not limited and in the present example, over 10,000 training images are generated to train the neural network engine 70. The training images may be used to train the neural network engine 70 to estimate mechanical heatmaps using a deep learning frame work such as Tensorflow (or PyTorch). Each of the estimated mechanical heatmaps may be compared to the ground truth with an appropriate loss function, such as a focal L2 loss. The loss function is a function of difference between ground truth and predicted values which the neural network attempts to minimize during training.

Figure 5:
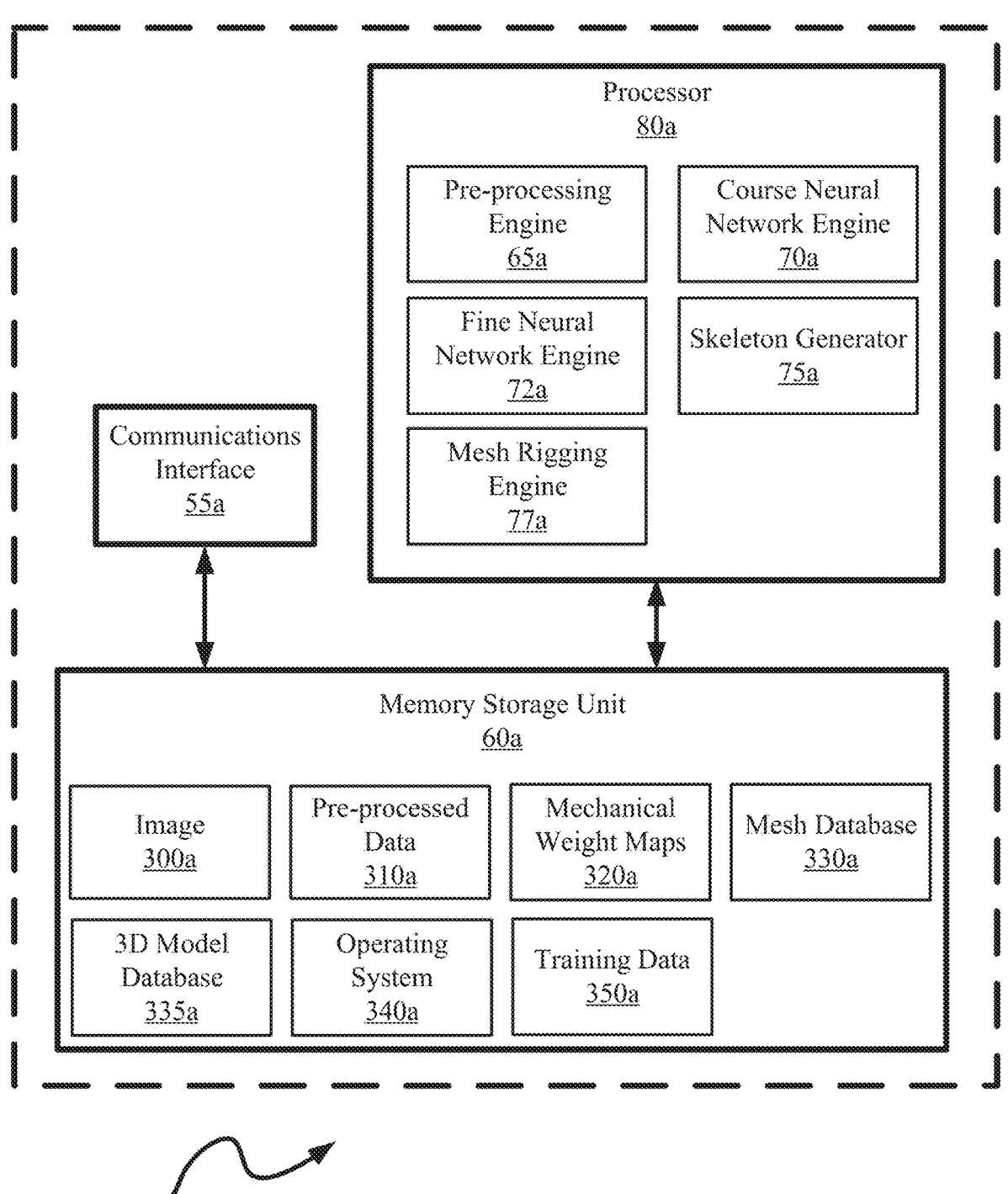
FIG. 5 is a schematic representation of the components of another example apparatus to generate and assign a mechanical weight index for mesh skinning.

Referring to FIG. 5, another schematic representation of an apparatus 50a to generate and assign a mechanical weight index based on a single two-dimensional image for mesh skinning is generally shown. Like components of the apparatus 50a bear like reference to their counterparts in the apparatus 50, except followed by the suffix "a". In the present example, the apparatus 50a includes a communications interface 55a, a memory storage unit 60a, and a processor 80a. In the present example, the processor 80a includes a pre-processing engine 65a, a coarse neural network engine 70a, a fine neural network engine 72a, a skeleton generator 75a and a mesh rigging engine 77a.

In the present example, the memory storage unit 60a may also maintain databases to store various data used by the apparatus 50a. For example, the memory storage unit 60a may include a database 300a to store raw data images received from an external source, a database 310a to store the data generated by the pre-processing engine 65a, a database 320a to store the two-dimensional mechanical heatmaps generated by the coarse neural network engine 70a, the fine neural network engine 72a, a database 330a to store two-dimensional key-points generated by the skeleton generator 75a, and a database 335a to store three-dimensional models generated by the mesh rigging engine 77a. In addition, the memory storage unit may include an operating system 340a that is executable by the processor 80a to provide general functionality to the apparatus 50a. Furthermore, the memory storage unit 60a may be encoded with codes to direct the processor 80a to carry out specific steps to perform a method described in more detail below. The memory storage unit 60a may also store instructions to carry out operations at the driver level as well as other hardware drivers to communicate with other components and peripheral devices of the apparatus 50*a*, such as various user interfaces to receive input or provide output.

The memory storage unit 60*a* may also include a synthetic training database 350*a* to store training data for training the neural network engine 70*a*. It is to be appreciated that although the present example stores the training data locally, other examples may store the training data externally, such as in a file server or cloud which may be accessed during the training of the coarse neural network engine 70*a* or the fine neural network engine 72*a* via the communications interface 55*a*.

In the present example, the processor 80*a* is to operate a coarse neural network engine 70*a* and a fine neural network engine 72*a*. The coarse neural network engine 70*a* is to be applied to a first set of key-point connectors. The fine neural network engine 72*a* is to be applied to a second set of key-point connectors. In the present example, the coarse neural network engine 70*a* is to process the first set of key-point connectors. The fine neural network engine 72*a* may then process a region already processed by the coarse neural network engine 70*a* to map finer details. In this example, the coarse neural network engine 70*a* may generate a heatmap for a hand as a key-point connector. The fine neural network engine 72*a* then generates a plurality of heatmaps for smaller key-point connectors or bones, such as the fingers of the hand. The plurality of heatmaps for the finer key-point connectors may then replace the original heatmap for the region generated by the coarse neural network engine 70*a*.

In other examples, each key-point connector may be processed by one of the coarse neural network engine 70*a* or the fine neural network engine 72*a* such that first set of key-point connectors and the second set of key-point connectors are mutually exclusive of each other. It is to be appreciated by a person of skill in the art that in other examples, the coarse neural network engine 70*a* and the fine neural network engine 72*a* may be applied to some key-point connectors in an overlap zone to generate mechanical heatmaps that may be averaged or reconciled with each other.

The fine neural network engine 72*a* is to generate a mechanical heatmap for a predefined key-point connector in close proximity to other key-point connectors based on a segmentation map from the pre-processing engine 65*a*. Accordingly, the fine neural network engine 72*a* may be trained to generate high resolution mechanical heatmaps for regions of the image where there is a high density of key-point connectors or bones. For example, the hand of a person may have many degrees of motion in a relatively small area of the image compared with the rest of the body of the person. Accordingly, this portion may include a high density of key-points and key-point connectors. By using the fine neural network engine 72*a* that may be specifically trained for fine features using specialized training datasets, more accurate mechanical heatmaps for a region may be generated.

The mechanical heatmaps generated by the coarse neural network engine 70*a* and the fine neural network engine 72*a* may be added together to infer the overall mechanical weight index of the key-point connector on a specific pixel.

In the present example, the neural network engine 72*a* is to apply a convolutional neural network trained to estimate mechanical heatmaps representing an estimated mechanical weight of each key-point connector or bone on each pixel. The network architecture used by the neural network engine 72*a* may be any deep neural network architecture with sufficient depth, receptive field and model complexity to be capable of learning to perform this task similar to the coarse neural network engine 70*a*. In other examples, the neural network engine 72*a* may have a different architecture from the neural network engine 70*a*.

Figure 6:
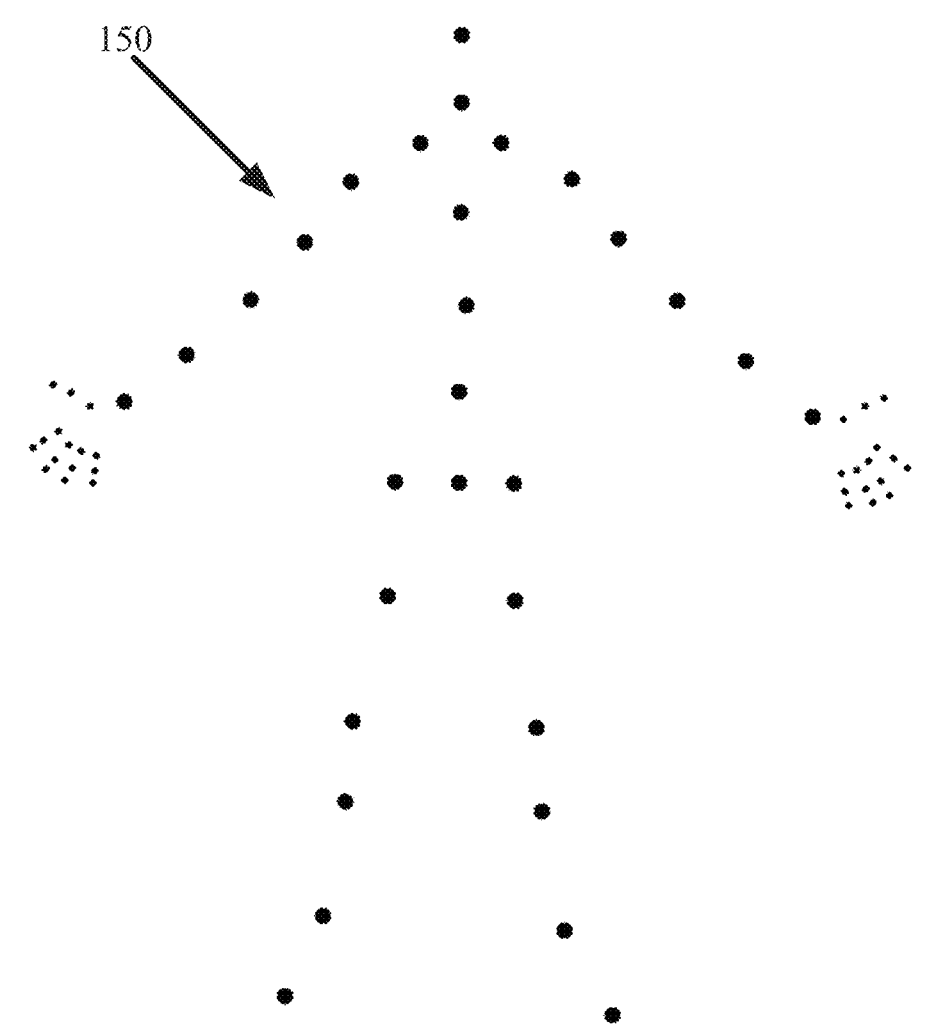
FIG. 6 is a representation illustrating the key-points of the image of FIG. 2.

In the present example, the skeleton generator 75*a* is to determine a two-dimensional position for each key-point in the model of predefined key-points based on the mechanical heatmaps generated by the coarse neural network engine 70*a* and/or the fine neural network engine 72*a*. The manner by which the two-dimensional positions are determined is not particularly limited. In the present example, each key-point may be determined based on regions of the mechanical heatmaps with the highest weight index. For example, the midpoint between regions in the mechanical heatmap of adjacent predefined key-point connectors be determined to be a key-point. In the present example of a person, the mechanical heatmaps for a lower arm and upper arm may be used to determine the position of an elbow. The manner by which a midpoint is determined is not limited. For example, a center of a region with values in the heatmap above a threshold value may be deemed to be the center of the associated key-point connector. The key-point may then be deemed to be the midpoint between the two centers of adjacent key-point connectors. The threshold value is not particularly limited and may be adjusted to improve accuracy. For example, if the heatmaps are normalized to a value between zero and one, a value of about 0.25 may be chosen as the threshold value. Referring to FIG. 6, two-dimensional key-points 150 are generated from the mechanical heatmaps shown in FIG. 4.

Furthermore, the skeleton generator 75*a* is to generate a three-dimensional position for each key-point 150 from the two-dimensional positions based on known information about each of the predefined key-points. The manner by which the three-dimensional position is determined is not particularly limited. For example, the three-dimensional position may be determined using image processing techniques to estimate a third-dimension of each key-point. For example, front and back surface information generated by the pre-processing engine 65*a* may be used to infer the position of the key-point. In this example, the third-dimension of a key-point may be deemed to be the average of front surface and back surface values associated with the key-point. In other examples, the third-dimension of some key-points, such as a spine key-point may be closer to the back surface.

Upon determining the three-dimensional positions of the key-points relative to the mesh, a kinematic chain may be defined. The definition of the kinematic chain is not particularly limited and may be determined based on the three-dimensional positions of each key-point of the plurality of key-points as well as the degrees and range of motion for each key-point. Each key-point may have a predefined range of motion, such as a range of angles which the connectors may rotate as well as degree of freedom, such as limiting the rotation to a two dimensional plane. Each connector between key-points may also be assumed to be rigid in the present example. Accordingly, the movement of one key-point or key-point connector will affect all other key-points in accordance with the movements predicted based on the kinematic chain. Continuing with the present example, the model of the object may be a person in an A-pose with predefined joints and bones. Accordingly, the joint defined as the pelvis may be arbitrarily selected as a reference point or root. The extremities of the person, such as the head, finger tips and toes, may be defined as the leaves of the kinematic chain. In this example, if the root or pelvis moves, all key-points will be translated accordingly. If the root is fixed while a leaf moves, all key-points between the root and the leaf move in accordance with the kinematic chain where there are forced rotations at some key-points.

The mesh rigging engine 77a is to generate a rigged three-dimensional mesh with vertices approximating the three-dimensional surface of the object in view and corresponding to the three-dimensional positions for each key-point based on known information about each of the pre-defined key-points. The mesh rigging engine 77a is not particularly limited and may take information from sensors such as one or more RGB cameras, depth sensors, LIDAR, or other sensors and may infer the mesh using a variety of possible techniques including classical surface triangulation methods, machine learning methods or other methods. In the present example, at each three-dimensional position determined by the skeleton generator 75a, a front and back surface depth positions of a mesh are determined based on prior information for each key-point about how far forward or back a vertex in the mesh is to be positioned. The prior information is not particularly limited and may be based on known attributes, such as anatomical features for each key-point. As an example, a key-point representing an elbow joint may assign a vertex about 5 cm in front and another vertex about 5 cm behind the key-point. In the present example, the corresponding offsets may be stored in a predetermined data table.

The mesh rigging engine 77a assigns a mechanical weight index to each corresponding vertex in the mesh. For example, the mesh rigging engine 77a may correspond each pixel in the mechanical heatmaps shown in FIG. 4 with a vertex. Accordingly, each vertex may have a weight index for each key-point connector having a mechanical heatmap and the sum of all mechanical heatmaps at each vertex is normalized, such as to a value of one. It is to be appreciated by a person of skill that the majority of the weight indices at each vertex will be zero or substantially zero. In some examples, each vertex may be associated with a limited number of mechanical weight indices, such as one, two or four values that represent the key-point connectors having the most influence on the vertex. In the present example, the mesh rigging engine 77a may select the weight indices for the vertex by selecting the mechanical heatmaps with greatest values at the nearest pixel corresponding to the vertex.

It is to be appreciated by a person of skill with the benefit of this description that each pixel in the mechanical heatmaps may correspond to multiple vertices, such as front and back vertices of the mesh, or multiple vertices for cases where the mesh is dense. In these examples, the vertices of the rigged three-dimensional mesh corresponding to a single pixel may be assigned the same sets of weights. Conversely, in examples where a vertex corresponds to multiple pixels, the weights of the vertex may be an average of the weights in the mechanical heatmaps for the pixels.

Figure 7:
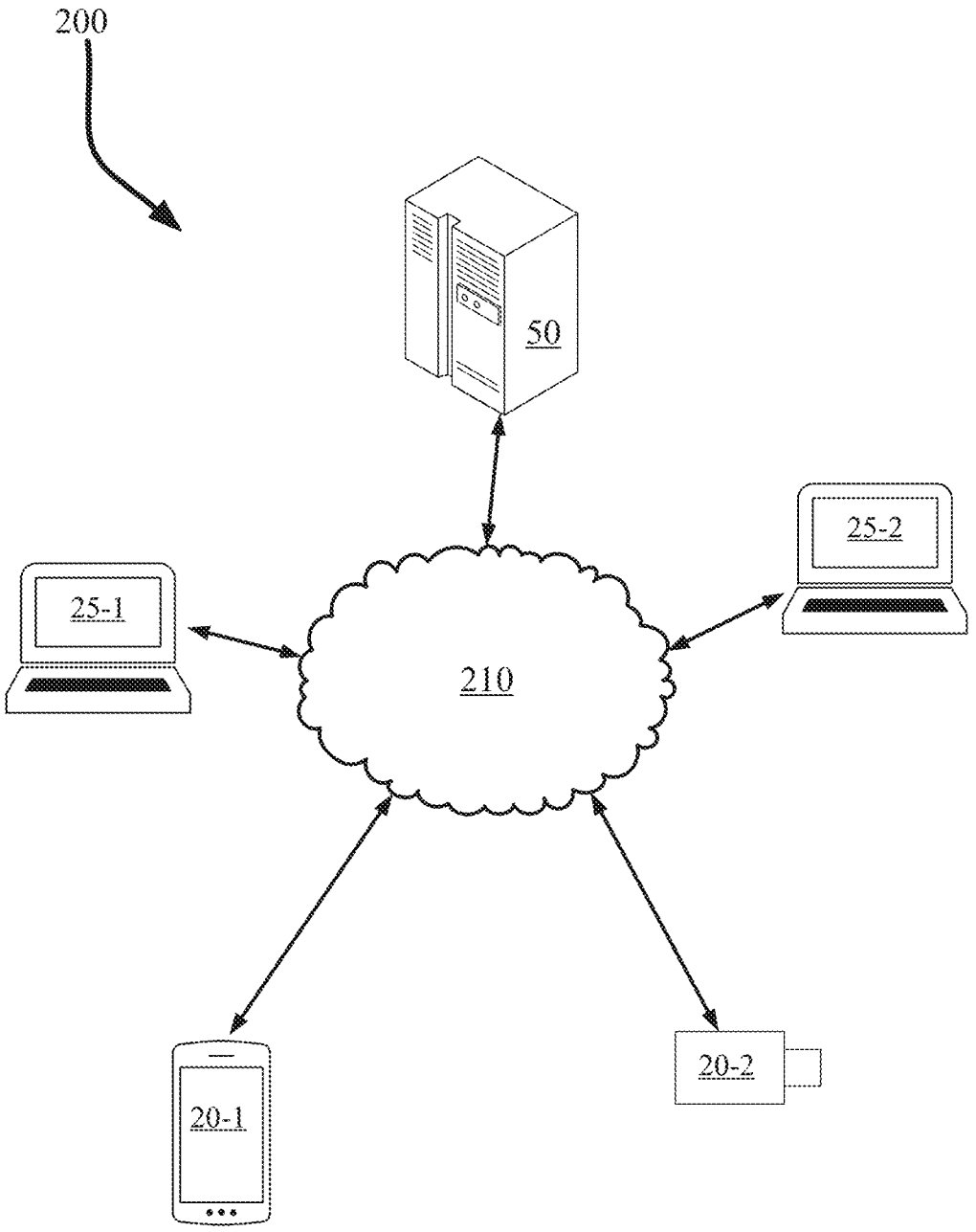
FIG. 7 is a schematic representation of a system to provide access to the apparatus to generate and assign a mechanical weight index for mesh skinning.

Referring to FIG. 7, a schematic representation of a computer network system is shown generally at 200. It is to be understood that the system 200 is purely exemplary and it will be apparent to those skilled in the art that a variety of computer network systems are contemplated. The system 200 includes the apparatus 50 to generate and assign a mechanical weight index based on a single two-dimensional image for mesh skinning, a plurality of external sources 20-1 and 20-2 (generically, these external sources are referred to herein as "external source 20" and collectively they are referred to as "external sources 20"), and a plurality of content requesters 25-1 and 25-2 (generically, these content requesters are referred to herein as "content requesters 25"

and collectively they are referred to as "content requesters 25") connected by a network 210. The network 210 is not particularly limited and may include any type of network such as the Internet, an intranet or a local area network, a mobile network, or a combination of any of these types of networks. In some examples, the network 210 may also include a peer to peer network.

In the present example, the external sources 20 may be any type of computing device used to communicate with the apparatus 50 over the network 210 for providing raw data such as an image of an object, such as a person in the A-pose. For example, the external source 20-1 may be a smartphone. It is to be appreciated by a person of skill with the benefit of this description that the smartphone may be substituted with a laptop computer, a portable electronic device, a gaming device, a mobile computing device, a portable computing device, a tablet computing device or the like. In some examples, the external source 20-2 may be a camera to capture an image. The raw data may be generated from an image or video received or captured at the external source 20. In other examples, it is to be appreciated that the external source 20 may be a personal computer or smartphone, on which content may be created such that the raw data is generated automatically from the content. The content requesters 25 may also be any type of computing device used to communicate with the apparatus 50 over the network 210 for receiving three-dimensional meshes with a mechanical weight index for each vertex to subsequently animate. For example, content requesters 25 may be a computer animator searching for a new avatar to animate in a program.

Figure 8:
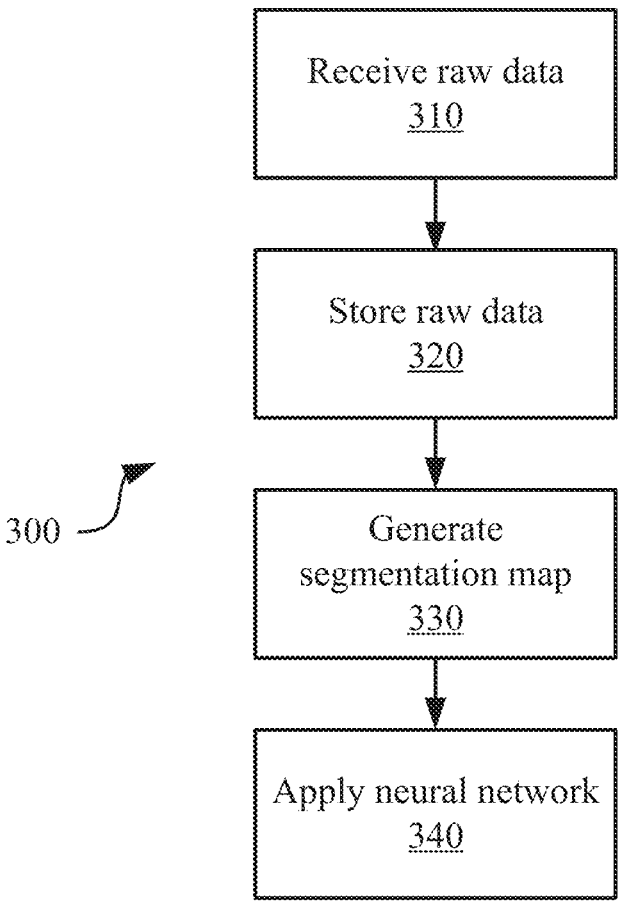
FIG. 8 is a flowchart of an example of a method of generating and assigning a mechanical weight index for mesh skinning.

Referring to FIG. 8, a flowchart of an example method of generating and assigning a mechanical weight index based on a single two-dimensional image for mesh skinning is generally shown at 300. In order to assist in the explanation of method 300, it will be assumed that method 300 may be performed by the apparatus 50. Indeed, the method 300 may be one way in which the apparatus 50 may be configured. Furthermore, the following discussion of method 300 may lead to a further understanding of the apparatus 50 and its components. In addition, it is to be emphasized, that method 300 may not be performed in the exact sequence as shown, and various blocks may be performed in parallel rather than in sequence, or in a different sequence altogether.

Beginning at block 310, the apparatus 50 receives raw data from an external source via the communications interface 55. In the present example, the raw data includes a representation of a person. In particular, the raw data is a two-dimensional image of the person in an A-pose. The manner by which the person is represented and the exact format of the two-dimensional image is not particularly limited. For example, the two-dimensional image may be an RGB format. In other examples, the two-dimensional image be in a different format, such as a raster graphic file or a compressed image file captured and processed by a camera. Once received at the apparatus 50, the raw data is to be stored in the memory storage unit 60 at block 320.

Block 330 involves generating a segmentation map with the pre-processing engine 65. The segmentation map is to generally provide an outline of the person in the raw image. Next, block 340 comprises the neural network engine 70 applying a neural network to the raw data to generate a mechanical heatmap for a predefined key-point connector as described above. The two-dimensional mechanical heatmap generated by the neural network engine 70 may then be combined with other mechanical heatmaps to generate a three-dimensional mesh with mechanical weight indices for each vertex of a mesh.

Various advantages will now become apparent to a person of skill in the art. In particular, by combining the information in the mechanical heatmaps generated by the apparatus 50 with one or more of a three-dimensional mesh, a set of three-dimensional key-point or joint positions, a kinematic chain, a set of weight indices at each vertex of the three-dimensional mesh can be created. The combination may be used to define skin weights in a single data structure to provide a standard skinned three-dimensional character model can be provided to be animated in many animation systems, such as Maya, Blender, and Mixamo, and game engines, such as Unity and Unreal Engine.

It should be recognized that features and aspects of the various examples provided above may be combined into further examples that also fall within the scope of the present disclosure.

We claim:

1. An apparatus comprising:
   a communications interface at which to receive a raw data image that includes a representation of a person;
   a memory storage unit in which to store the raw data image;
   a pre-processing engine that is configured to;
      generate, from the raw data image, a segmentation map that outlines the person and that is representative of a mask of the person, and
      identify, in the segmentation map, a position for each key-point of a plurality of key-points based on the raw data image, so as to identify a plurality of positions,
         wherein each key-point of the plurality of key-points corresponds to a different one of a plurality of joints; and
   a neural network engine that is configured to:
      generate, based on the segmentation map, a mechanical heatmap for a key-point connector that is representative of a linkage between a first one of the plurality of key-points and a second one of the plurality of key-points, wherein the key-point connector corresponds to a bone, and
         wherein the mechanical heatmap includes a mechanical weight index in which an estimated mechanical weight is assigned to each pixel in the raw data image.

2. The apparatus of claim 1, wherein attributes of each key-point of the plurality of key-points are predefined.

3. The apparatus of claim 2, wherein the neural network engine is further configured to generate a plurality of mechanical heatmaps to correspond with a plurality of key-point connectors, each of which corresponds to a different pair of the plurality of key-points, and wherein the plurality of mechanical heatmaps includes the mechanical heatmap and the plurality of key-point connectors includes the key-point connector.

4. The apparatus of claim 3, further comprising a skeleton generator that is configured to determine a two-dimensional position for each key-point of the plurality of key-points based on the plurality of mechanical heatmaps generated for the plurality of key-point connectors.

5. The apparatus of claim 4, wherein the skeleton generator is further configured to determine a three-dimensional position for each key-point of the plurality of key-points from the two-dimensional position.

6. The apparatus of claim 5, wherein the skeleton generator is further configured to define a kinematic chain from the three-dimensional position for each key-point of the plurality of key-points.

7. The apparatus of claim 6, further comprising a mesh rigging engine that is configured to generate a rigged three-dimensional mesh based on the three-dimensional position for each key-point from the plurality of key-points.

8. The apparatus of claim 7, wherein each vertex of the rigged three-dimensional mesh is determined by the mesh rigging engine based on a known anatomical feature associated with each key-point from the plurality of key-points.

9. The apparatus of claim 8, wherein the mesh rigging engine assigns a mechanical weight index to each vertex of the rigged three-dimensional mesh.

10. The apparatus of claim 3, wherein the neural network engine is a first neural network engine to process a first subset of key-point connectors from the plurality of key-point connectors, and further comprising a second neural network engine to process a second subset of key-point connectors from the plurality of key-point connectors, wherein the first subset and the second subset are mutually exclusive.

11. The apparatus of claim 10, wherein the second neural network engine is trained to generate high resolution heatmaps.

12. A method comprising:
   receiving raw data that includes a representation of a person;
   generating a segmentation map that outlines the person and that is representative of a mask of the person;
   identifying, in the segmentation map, a position for each key-point of a plurality of key-points based on an analysis of the raw data, so as to identify a plurality of positions; and
   applying a neural network to generate a mechanical heatmap based on the segmentation map to represent a mechanical weight index of a predefined key-point connector for each pixel,
      wherein the predefined key-point connector is representative of a linkage between a first one of the plurality of key-points and a second one of the plurality of key-points.

13. The method of claim 12, wherein attributes of each key-point of the plurality of key-points are predefined.

14. The method of claim 13, further comprising applying the neural network for each key-point connector to generate a plurality of mechanical heatmaps to correspond with a plurality of key-point connectors, wherein the plurality of mechanical heatmaps includes the mechanical heatmap and the plurality of key-point connectors includes the predefined key-point connector.

15. The method of claim 14, further comprising determining a two-dimensional position for each key-point of the plurality of key-points based on the plurality of mechanical heatmaps.

16. The method of claim 15, further comprising determining a three-dimensional position for each key-point of the plurality of key-points from the two-dimensional position.

17. The method of claim 16, further comprising defining a kinematic chain from the three-dimensional position for each key-point of the plurality of key-points.

18. The method of claim 17, further comprising generating a rigged three-dimensional mesh based on the three-dimensional position for each key-point from the plurality of key-points.

19. The method of claim 18, further comprising determining each vertex of the rigged three-dimensional mesh based on a known anatomical feature associated with each key-point from the plurality of key-points.

20. The method of claim 19, further comprising assigning a mechanical weight index to each vertex of the rigged three-dimensional mesh.

21. The method of claim 14, wherein applying the neural network comprises:

applying a first neural network to a first subset of key-point connectors from the plurality of key-point connectors, and wherein the method further comprises:

applying a second neural network engine to process a second subset of key-point connectors from the plurality of key-point connectors, wherein the first subset and the second subset are mutually exclusive.

22. The method of claim 21, wherein applying the second neural network engine is to generate high resolution heatmaps.

23. A non-transitory computer readable medium encoded with codes, wherein the codes are to direct a processor to:

receive raw data that includes a representation of a person;

generate, from the raw data, a segmentation map that outlines the person and that is representative of a mask of the person;

identify, in the segmentation map, a position for each key-point of a plurality of key-points by generating a two-dimensional heatmap for each key-point based on the raw data and then identifying a hot spot in the two-dimensional heatmap that is representative of the position; and apply, to the segmentation map, a neural network that produces, as output, a mechanical heatmap that represents a mechanical weight index of a predefined key-point connector for each pixel, wherein the predefined key-point connector is representative of a linkage between a first one of the plurality of key-points and a second one of the plurality of key-points.

\*    \*    \*    \*    \*